United States Patent

[11] 3,586,101

[72] Inventors Richard C. Chu
Poughkeepsie;
Omkarnath R. Gupta, Poughkeepsie; Un-Pah Hwang, Poughkeepsie; Kevin P. Moran, Wappingers Falls; Robert E. Simons, Poughkeepsie, all of, N.Y.
[21] Appl. No. 887,080
[22] Filed Dec. 22, 1969
[45] Patented June 22, 1971
[73] Assignee International Business Machines Corpoation
Armonk, N.Y.

[54] COOLING SYSTEM FOR DATA PROCESSING EQUIPMENT
8 Claims, 2 Drawing Figs.

[52] U.S. Cl. .................................................... 165/101,
165/105, 62/333, 174/15
[51] Int. Cl. .................................................... F28d 15/00
[50] Field of Search ........................................ 165/22, 50,
80, 105, 101; 62/434, 333; 174/15

[56] References Cited
UNITED STATES PATENTS
3,404,730 10/1968 Kurisu .......................... 165/105
3,512,582 5/1970 Chu et al. ...................... 165/105

*Primary Examiner*—Charles Sukalo
*Attorneys*—Hanifin and Jancin and Harold Sweeney, Jr.

ABSTRACT: A plurality of electronic component modules to be cooled are located in each of a plurality of chambers through which a cooling liquid circulates by gravitational force from a buffer storage reservoir located at the top of said cooling system. Input connecting means are provided connecting each of the plurality of chambers to the above located buffer storage reservoir. A plurality of output conduits, all of the same length are provided, each connecting a respective one of said chambers to a phase-separation column. Nucleate boiling takes place at the hot components in the chambers and two-phase flow consisting of boiling vapor bubbles and cooling liquid passes through an output connection to a phase-separation column where the vapor bubbles rise and the liquid drops back into the circulation system. A condenser is located above the phase-separation column for condensing the rising vapor bubbles. Cooling means are located in the circulation means for returning the cooling liquid to a temperature below the boiling point.

PATENTED JUN 22 1971 3,586,101

Figures 1, 1A:
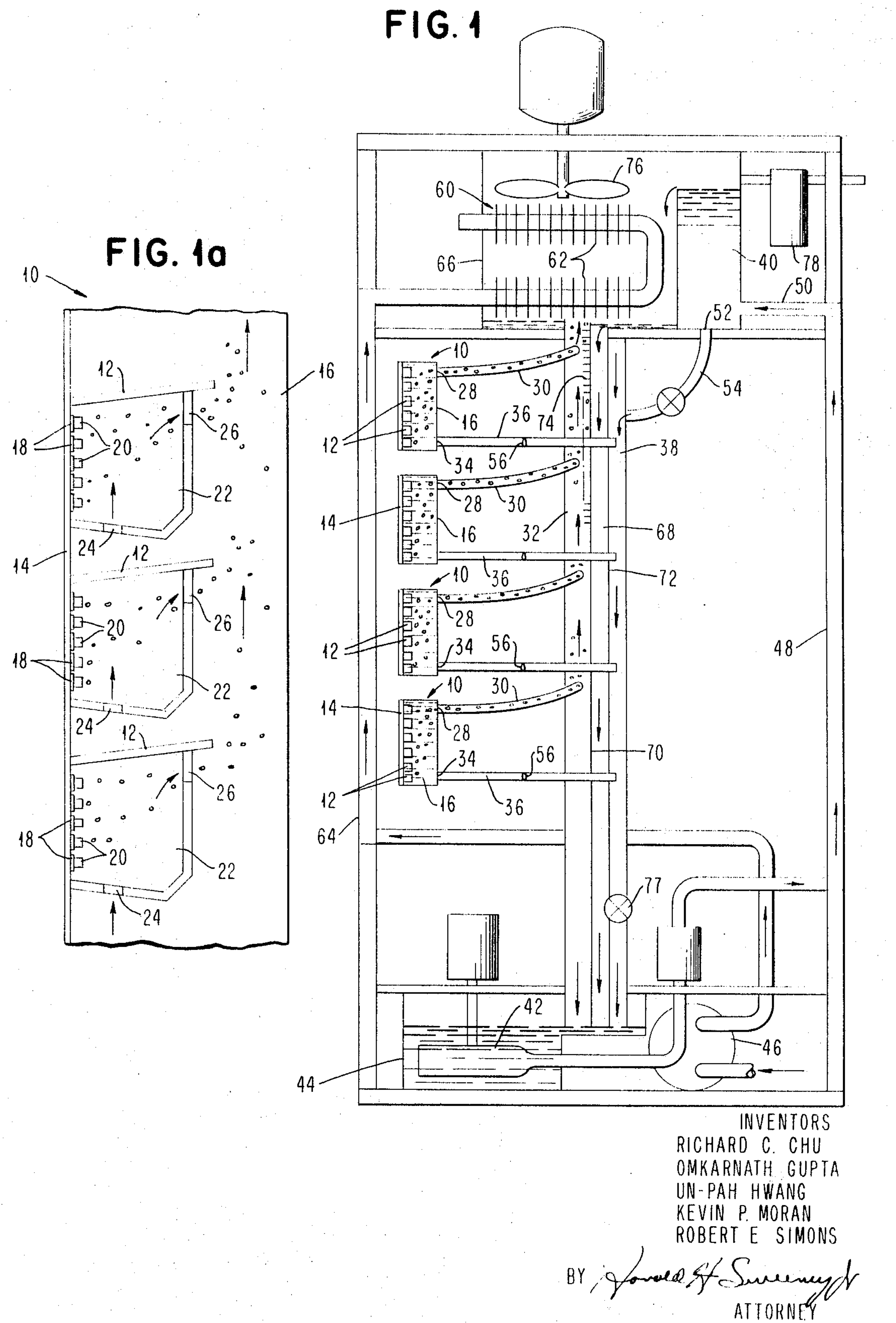

INVENTORS
RICHARD C. CHU
OMKARNATH GUPTA
UN-PAH HWANG
KEVIN P. MORAN
ROBERT E. SIMONS

BY [signature]
ATTORNEY

COOLING SYSTEM FOR DATA PROCESSING EQUIPMENT

This invention relates to an improved cooling system for data processing equipment, and more particularly, to an improved cooling system for removing heat from modularly packaged electronic components.

As further techniques for miniaturizing electronic components have been developed, one of the size limiting factors has been the cooling. As the components are reduced in size, the area from which the heat can be dissipated has likewise been reduced. Accordingly, new techniques for cooling these miniatruized components have become necessary. Recently, immersion-type cooling systems have been investigated wherein the array of components to be cooled is immersed in a tank of cooling liquid. The liquids used are the new dielectric fluorocarbon liquids which have a low boiling point. These liquids give rise to various modes of cooling at relatively low temperatures. The mode of cooling, and consequently the heat transfer, is dependent on the heat flux at the surface interface between the component to be cooled and the cooling liquid. For a heat flux which produces a temperature below the boiling point of the liquid, natural convection takes place. as the heat flux increases the temperature beyond the boiling point of the liquid, nucleate boiling takes place. The nucleate boiling causes the vaporization of the liquid immediately adjacent the hot component. As the vapor bubbles form and grow on the heated surface, they cause intense microconvection currents. Thus, nucleate boiling gives rise to an increase in convection cooling within the liquid and, accordingly, improves the heat transfer between the hot surface and the liquid. As the heat flux increases, the nucleate boiling increases to the point where the bubbles begin to coalesce and heat transfer by vaporization predominates. Heat transfer by nucleate boiling has proven to be very efficient. However, there are problems in servicing and packaging components which are cooled using this technique.

In copending U.S. Pat. application, Ser. No. 865,710, filed Oct. 13, 1969, a colling system is disclosed which has thermally induced circulation of cooling liquid which provides some regulation of the cooling of modularly packaged electronic components. The regulation is provided by two-phase flow which takes place in the return line from the modules to the above located cooling tplp f etcoo csinuwhich a plurality of electronic component modules to be cooled are located in chambers which have a cooling liquid circulating therethrough by gravity feed from a buffer storage reservoir located at the top of the cooling system, A phase-separation column is provided which is connected to the output of each of the module chambers by equal length conduits. The components within the modules give rise to nucleate boiling within the cooling liquid. The The cooling provided by this two-phase self-regulating flow cooling system has proved to be very efficient for low and medium power systems. However, a more efficient cooling system is needed for high power applications where considerably more heat is generated. The two main features which limit the efficiency of such a cooling system are the limitation on circulation through the module cooling chambers and the back pressures generated in the module chambers caused by the cooling fluid in the conduits leading from the various chambers to the above located liquid reservoir. By virture of the vertical location of a particular module in the array, the back pressure will differ.

It is a further object of the present invention to provide an improved cooling system in which all of the vertical liquid transfer is accomplished via vertical frame members.

Briefly, the invention comprises an improved liquid cooling system for data processing equipment in which a plurality of electronic component modules to be cooled are located in chambers which have a cooling liquid circulating therethrough by gravity feed from a buffer storage reservoir located at the top of the cooling system. A phase-separation column is provided which is connected to the output of each of the module chambers by equal length conduits. The components within the modules give rise to nucleate boiling within the cooling liquid. The vapor bubbles and the cooling liquid pass through the conduit and enter the phase-separation column where the vapor bubbles rise and the liquid drops. A condenser is located above the phase-separation column for condensing the vapor bubbles. The condensate and the liquid in the phase-separation column are returned to the circulation system. located A cooling means is located in the circulation system for returning the cooling fluid to a temperature below the boiling point.

The foregoing and other objects, features and advantages of the invention will be apparent from the following more particular description of a preferred embodiment of the invention, as illustrated in the accompanying drawings.

FIG. 1 is a schematic diagram of a cooling system for data processing equipment.

FIG. 1*a* is a blown up schematic view of part of a circuit board unit showing the electronic component modules mounted therein for cooling.

Referring to FIG. 1, there are shown a plurality of circuit board units 10 each of which contain a plurality of electronic component modules 12 to be cooled. The modules 12 are mounted on the back of a printed circuit board 14. The modules 12 are included in a cooling chamber 16 which extends around the back of the circuit board 14. Each of the electronic component modules 12 consist of semiconductor chips 18 mounted on a stud 20 which extends into a small chamber 22. A number of these chips and studs 20 are included in the one chamber 22 and form the electronic component module 12. The small chamber 22 has a bottom inlet 24 and a top outlet 26 so that the cooling fluid can circulate therethrough. A number of these electronic component modules 12 are shown in FIG. 1*a*. The semiconductor devices 18, when energized, generate heat which is conducted to the studs 20 where nucleate boiling takes place. The boiling bubbles rise and pass out the outlet opening 26 of the small chamber 22 into the larger circuit card chamber 16. As the heat flux generated by the semiconductor devices 18 increases, the nucleate boiling tends to increase within specified limits and thereby increase the cooling. Each circuit card chamber 16 has an outlet 28 near the top connected to conduit 30 which connects the chamber 16 to a phase-separation column 32. The chamber 16 also has an inlet opening 34 near the bottom for connecting via a conduit 36 to an input column 38. The input column 38 consists of a column within a vertical frame member of the data processing equipment. The input column 38 is connected near the top thereof to a buffer storage reservoir 40 which is located in a circulation system. The circulation system consists of a pump 42 located in a bottom located reservoir 44 of the cooling liquid. The liquid is pumped from the reservoir 44 to a buffer storage reservoir 40 through a subcooler 46 where it is cooled, to a predetermined temperature below its coiling point. The cooling liquid after passing through the subcooler 46 is circulated up a conduit 48 which is formed of another vertical frame member of the data processing equipment. The liquid is circulated from the top of the vertical frame member 48 to the buffer storage reservoir 40 via a conduit 50. The liquid, by virtue of gravity, flows out of an opening 52 and thru a conduit 54 at the bottom of the reservoir 40 to the input column 38. As the input column 38 fills with liquid, the liquid passes from the input column 38 through the input connection means 36 to the respective circuit card chambers 16. The cooling liquid can be drained by opening the valve 77 at bottom of the input column 38 to the bottom reservoir 44. This bottom reservoir 44 is sufficiently big to accommodate all the cooling fluid in the system. Thus, if the entire cooling system is drained, the bottom reservoir 44 would be practically full. The differences in the vertical location of the circuit card members 16 with respect to the buffer storage reservoir 40, from whence the cooling fluid is obtained, provides a difference in liquid pressure within each of the circuit card chambers 16. In order to maintain equal pressures within each circuit card chamber 16 regardless of the vertical location thereof, an orifice 56 is located in each of the input lines 36 to the circuit card chambers 16. These orifices 56 are of successively smaller openings for each successively lower location in the vertical column. Thus, by the correct initial adjustment of the orifice 56, the liquid pressure within each of the circuit card chambers 16 is made substantially the same.

The conduit connection 30 between the output opening 28 of each circuit card chamber 16 and the phase-separation column 32 is of equal length. Two-phase flow takes place within this conduit 30 as the cooling liquid and the vapor bubbles from the circuit card chamber 16 flow therethrough. As the two-phase flow emerges from the conduit 30 within the phase-separation column 32, the vapor bubbles rise in the column and the cooling liquid falls within the column to the bottom reservoir 44 located beneath the column 32. It will be appreciated, that the phase-separation column 32 provides low back pressure to the circuit board chambers 16. The only back pressure is due to the small pressure drop of the fluid within the short conduit connection 30 between the circuit card chamber 16 and the phase-separation column 32. If each of these conduit connections 30 are kept equal and short in length, the back pressures are maintained equal and small. The phase-separation column 32, likewise, is part of a vertical frame member or can be a vertical frame member itself. The bubbles emerging from the top of the phase-separation column 32 contact a condenser 60 where the vapors are condensed. The condenser 60 consists of a number of fins 62 which are maintained cool by a cool liquid flowing therethrough. This secondary liquid is obtained from an auxiliary source, not shown, and is circulated through the subcooler 46 and is then pumped up a vertical frame member conduit 64 to the condenser 60. The condensate from the condenser 60 drips into the bottom of the container 66 in which the condenser 60 is located and thus flows down an overflow column 68 which is located within the same vertical frame member as the phase-separation column 32 and is contiguous therewith. That is, the overflow column 68 shares a common wall 70 with the phase-separation column 32 within the vertical frame member. Also, the other wall 72 of the overflow column 68 is shown as a common wall between the input column 38 and the overflow column 68. The circulating system is arranged to provide more circulation than is provided by the gravitational flow from the bottom of the buffer storage reservoir 40. Thus, the buffer storage reservoir 40 which is open tends to continuously overflow and the overflow collects in the chamber 60 in which the buffer storage reservoir 40 is located. This overflow runs down the overflow column 68 along with the condensate to the bottom reservoir 44. This overflowing cooling liquid provides a low cooling to the common wall 70 shared with the phase-separation column 32. Thus, the wall 70 serves as a heat exchange means or a condenser for the vapor bubbles therein. Fins 74 can be located along the wall 70 extending into the phase-separation column 32 to enhance the condensation of the vapor bubbles thereon. The liquid in the overflow column 68 also empties into the bottom reservoir. It mixes in this bottom reservoir with the liquid which has been heated by circulation thru the modules. The cooler liquid from the overflow column subcools the liquid in the bottom reservoir thereby reducing the possibility of cavitation in the circulation pump which is immersed in the liquid in the bottom reservoir.

The buffer storage reservoir 40 is of sufficient size to provide the cooling fluid flow for a predetermined time as the buffer storage reservoir 40 empties, when there is a failure in the circulating system. This time period, for example, 30 seconds, would be sufficient to switch over to an auxiliary circulation pump (not shown).

A turbulator in the form of a motor driven blade 76 is located above the condenser. The fan 76 sets up turbulence at the condenser 60 surface and enhances the condensation by providing good circulation so the vapor bubbles contact the cooling fins 62. A dehumidifier unit 78 is connected to the upper chamber 66 holding the buffer storage reservoir 40. This unit controls the ambient air within the chamber as the cooling fluid and vapors tend to cause saturation of the ambient air and may cause problems by condensing on frame members, etc.

It will be appreciated, that the cooling system is not limited to a column of circuit board units 10 to be cooled but can handle a number of columns of circuit board units connected similar to those shown in FIG. 1.

While the invention has been particularly shown and described with reference to a preferred embodiment thereof, it will be understood by those skilled in the art that various changes in form and detail may be made therein without departing from the spirit and scope of the invention.

What I claim is:

1. An improved liquid cooling system for data processing equipment comprising:
- a plurality of electronic component modules to be cooled;
- a plurality of chambers having at least one of said electronic component modules located in each chamber;
- a cooling liquid circulating system;
- a buffer storage reservoir located at the top of said cooling system for providing a gravity feed source of cooling liquid;
- input connecting means connecting each of said plurality of chambers to said buffer storage reservoir, said plurality of chambers being located below said buffer storage reservoir so that the liquid flows thereto under gravitational force;
- a phase-separation column;
- a plurality of output conduits all of the same length, each connecting a respective one of said chambers to said phase-separation column so that the two-phase flow of vapor bubbles and cooling liquid is fed to said column where the vapor bubbles rise and the liquid drops;
- condenser means located above said phase-separation column for condensing the vapor bubbles, the liquid in said column and the condenser vapor returning to said circulation system; and
- cooling means located in said circulation system for returning the cooling fluid to a temperature below the boiling point.

2. An improved liquid cooling system according to claim 1, wherein an overflow column is provided located contiguous to said phase separation column and providing an overflow path for the overflow cooling liquid from the buffer reservoir in said circulation system, said overflow column forming a heat exchange means for said phase-separation column.

3. An improved liquid cooling system according to claim 2, wherein said input connecting means connecting each of said plurality of chambers to said buffer storage reservoir includes a vertical input column connected near the top to said buffer storage reservoir and includes a conduit connection to each of said chambers from said vertical input column so that each of said chambers has cooling liquid passing therethrough under gravitational force.

4. An improved liquid cooling system according to claim 3, wherein a vertical frame member of said data processing equipment includes said phase-separation column, said overflow column and said input column.

5. An improved liquid cooling system according to claim 4, wherein said phase-separation column and said overflow column are separated by a common wall formed of a good heat conductive material.

6. An improved liquid cooling system according to claim 5, wherein fins are provided attached to said common wall in good heat conducting relationship so as to extend into said two-phase flow column to serve as auxiliary condensing means for said rising vapor.

7. Apparatus according to claim 1, wherein said cooling liquid circulation system includes a hollow vertical frame member and a pump which pumps the cooling liquid thru said hollow frame member to said open buffer storage reservoir.

8. Apparatus according to claim 1, wherein said condensing means located at the top of said two-phase flow column includes a hollow vertical frame member thru which cooled liquid is pumped.

UNITED STATES PATENT OFFICE
CERTIFICATE OF CORRECTION

Patent No. 3,586,101 Dated June 22, 1971

Inventor(s) Richard C. Chu et al.

It is certified that error appears in the above-identified patent and that said Letters Patent are hereby corrected as shown below:

Column 1, line 44, after "cooling" the remainder of the line and all the matter beginning with line 45 to and including line 52 should be canceled and -- fluid reservoir. The two-phase flow consists of vapor bubbles and cooling liquid. As the two enter the container, the vapors rise into contact with a condenser and the fluid drops into the fluid contained in the container. The cooling provided by this two-phase -- should be inserted therefor;

Column 1, between the lines 63 and 64, insert the following paragraphs:

--Accordingly, it is the main object of the present invention to provide a more efficient cooling system for handling the higher heat fluxes generated in higher power data processing equipment.

It is another object of the present invention to provide an improved liquid cooling system which provides a minimum and equal back pressure at each module to be cooled.

It is a further object of the present invention to provide an improved liquid cooling system which has additional condensing means for cooling liquid vapors.

It is a further object of the present invention to provide an improved cooling system which provides cooling for a predetermined time after circulation failure.--

Signed and sealed this 18th day of January 1972.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334